(12) United States Patent
Smith (10) Patent No.: US 10,294,169 B2
(45) Date of Patent: May 21, 2019

(54) COMPOSTING APPARATUS

(71) Applicant: Scott E. Smith, Church Hill, MD (US)

(72) Inventor: Scott E. Smith, Church Hill, MD (US)

( * ) Notice: Subject to any disclaimer, the term of this patent is extended or adjusted under 35 U.S.C. 154(b) by 280 days.

(21) Appl. No.: 15/266,190

(22) Filed: Sep. 15, 2016

(65) Prior Publication Data

US 2018/0072635 A1   Mar. 15, 2018

(51) Int. Cl.
| | | |
|---|---|---|
| *G01N 1/00* | (2006.01) | |
| *C05F 17/02* | (2006.01) | |
| *C05F 9/02* | (2006.01) | |
| *C05F 17/00* | (2006.01) | |

(52) U.S. Cl.
CPC ............ *C05F 17/0205* (2013.01); *C05F 9/02* (2013.01); *C05F 17/0045* (2013.01); *C05F 17/027* (2013.01); *C05F 17/0258* (2013.01); *Y02P 20/145* (2015.11); *Y02W 30/43* (2015.05)

(58) Field of Classification Search
CPC .................................................. C05F 17/0205
See application file for complete search history.

(56) References Cited

U.S. PATENT DOCUMENTS

| | | | |
|---|---|---|---|
| 3,859,672 A | * | 1/1975 | Modig .................. A47K 11/02 4/111.1 |
| 4,042,219 A | | 8/1977 | Terry |
| 5,102,803 A | | 4/1992 | Weaver |
| 5,433,424 A | | 7/1995 | Watanabe |
| 5,744,351 A | | 4/1998 | Bryan-Brown |
| 5,948,674 A | | 9/1999 | Mankiewicz |
| 6,482,627 B1 | | 11/2002 | Dahlstrom |
| 2003/0180940 A1 | | 9/2003 | Watson et al. |

\* cited by examiner

*Primary Examiner* — Jyoti Nagpaul
(74) *Attorney, Agent, or Firm* — Bacon & Thomas, PLLC (57) ABSTRACT

A cylindrical container or vessel, for example a pail, includes a bi-directionally rotatable internal auger having a rotation axis extending across a diameter of the shaft and manually-rotated by a handle outside the container, and tines extending in a radial direction of the shaft and arranged to turn and loosen contents of the container. The tines have different lengths and a predetermined relative spacing along the shaft, and be arranged extend at different angles, in order to maximize an amount of matter moved by the tines when rotating the shaft. The container may be vented to optimize aeration.

18 Claims, 5 Drawing Sheets

COMPOSTING APPARATUS

BACKGROUND OF THE INVENTION

1. Field of the Invention

The invention relates to a composting apparatus, and in particular to a composting apparatus in the form of a container, pail, or vessel with an internal, manually-operated auger for enhancing aeration of biodegradable organic materials in the container. The manually-operated auger includes a rotatable shaft extending horizontal between diametrically opposite sides of the container, an external handle, and a plurality of radially-extending tines having lengths that vary with the distance of the respective tines from a side of the bucket, such that the tines are longest at a center of the shaft and shortest at points on the shaft that are closest to sides of the container. In addition, the tines are angularly distributed around a circumference of the shaft, thereby permitting a maximum amount of material to be moved with a minimum of effort on the part of the user.

2. Description of Related Art

There is a critical need to increase the availability and utilization of natural organic matter recycling, and in particular composting of organic matter. As cities and towns grow larger, an ever increasing amount of organic matter that could otherwise be recycled, together with millions of plastic bags used to hold the organic matter, ends up in landfills as a result of lack of convenient and economically viable way to utilize the organic matter. In response, some municipalities have begun to collect compostable materials and transport them to a central composting facility. However, the cost of such facilities and the expense and energy required to transport the materials to the central facility have so far limited their availability. A more environmentally friendly solution would be to compost organic waste materials and scraps in situ, i.e., in individual households and small businesses such as restaurants, and to apply the compost directly to gardens and household plants, thereby eliminating the need to transport the compostable material.

It has previously been proposed to provide small-scale composting facilities, such as composting bins, piles, drums, pails or buckets. However, in general, the existing systems have either tended to be large and inefficient because they lack proper aeration, or overly complicated and expensive. The speed of decomposition depends on many factors, including the carbon to nitrogen ration of the material, the amount of surface area that is exposed to air, and the amount of oxygen available to the microorganisms. Aeration increases the amount of available, thereby ensuring an adequate oxygen supply to the microorganisms that carry out the composting, and allowing the composting process to keep up with the amount of organic waste and scraps available for composting, and reducing odors and attraction to insects or other vermin.

Decomposition by microorganisms in a conventional composting container, pail, or vessel takes place when particle surfaces are in contact with air. Chopping or breaking up the material increases the surface area of the material to be composted. The increased surface area enables the microorganisms to digest more material, multiply more quickly and generate more heat. It is not necessary to increase the surface area when composting, but doing so speeds up the process. In addition, venting or forced aeration can be used to speed up decomposition, as described for example in U.S. Pat. No. 6,482,627, which discloses a composting container with vent openings and internal tubes to enhance aeration.

For greatest efficiency, however, composting organic matter not only needs to have air but also to be turned frequently. Frequent turning offers important advantages in addition to faster decomposition. These advantages include the higher temperatures produced as a result of turning, since temperatures ranging from 90 to 140 degrees Fahrenheit will kill major disease organisms and provide a good environment for the most effective decomposer organisms.

One way to achieve frequent turning is to add automated mechanisms that mix or turn over the contents of a composting container. While common in large scale bio-reactors, automated mechanisms have also been proposed for use in small-scale reactors suitable for individual household use. For example, U.S. Pat. Nos. 5,948,674, 5,744,351, and 5,102,803 each discloses a motorized mechanism for turning organic matter in a composting container. In particular, each of these patents discloses the inclusion of an auger in the form of a helix rotatable by the motor about a vertical axis, with the auger of U.S. Pat. No. 5,744,351 additionally having a rotation axis that is movable horizontally to cover a larger container.

Another motorized arrangement that utilizes radially-extending angled vanes distributed along the length of a longitudinally extending shaft, such that each vane is at fixed, identical angular separation from adjacent vanes, is disclosed in U.S. Patent Publication No. 2003/0180940. The effect of the arrangement of vanes is to not only mix the contents of the container, but also to transport materials axially through the container from one end to the opposite end.

While the foregoing motorized auger arrangements have the advantage of providing frequent or continuous turning of the compost materials, they have the disadvantages of being complex, expensive, and less environmentally friendly due to higher energy consumption. These problems are reduced by using containers with rotatable drums and fixed internal vanes such as the composting toilet disclosed in U.S. Pat. No. 4,042,219, or the container disclosed in U.S. Pat. No. 5,433,424, which includes an internal helical auger that rotates about an axis and further revolves around a central axis in a planetary arrangement. However, rotating drum arrangements are less efficient than internal auger arrangements at turning the organic materials, and require a relatively large amount of force to turn, while the internal auger arrangement of U.S. Pat. No. 5,433,424 is disadvantageous in that it only turns over a small percentage of the contents of the container at any one time and, because of the additional planetary motion, requires a relatively high degree of effort to manually operate and is relatively complex.

In each of these prior composting arrangements, the containers are directly filled with organic scraps or waste material to be composted. The amount of aeration and the ease or efficiency of mixing will depend, at least in part, on the density and size of individual pieces off material. While it is known to add material such as peat moss and pine bedding wood chips as a carbon source, none of the containers with aeration mechanisms provides for the inclusion of such bedding. The addition of pine bedding wood chips allows air pockets into the organic matter, providing additional spacing for aeration, while both the pine bedding and the peat moss serve as an additional carbon source for the organisms that break down the scraps or waste material to be composted.

As noted above, in order to encourage more households to compost their organic waste and scraps, the composting mechanism should be small in size, inexpensive, simple to operate, and odor free, and yet still be able to efficiently convert compostable materials in as short a time as possible. None of the previously-proposed arrangements offers all of these advantages.

A need therefore exists for a composting container that is small and lightweight, portable, easy to use, affordable, and that can be manually operated. Such a composting container allows small scale composting to be done by every household on the planet, thereby helping the environment by keeping tons of organic matter and millions of plastic bags out of landfills.

SUMMARY OF THE INVENTION

It is accordingly an objective of the invention to provide a composting arrangement that is suitable for widespread household use, in order to reduce the amount of organic matter disposed of in landfills or that must be transported to central composting facilities.

This objective is achieved by a cylindrical container or vessel, for example a pail, having a bi-directionally rotatable internal auger whose rotation shaft extends horizontally across a diameter of the container, that is manually-rotated by a handle fixed to the shaft at a location outside the container, and that includes tines extending in a radial direction of the shaft for turning and loosening contents of the container in order to enhance aeration and bring newly added material into contact with microbes to aid in faster decomposition of organic matter.

In a preferred embodiment of the invention, the tines are spaced along a length of the internal shaft and have different lengths, with the longest tines being at a midpoint of the shaft and the shortest tines at ends of the shaft such that the ends of the tines extend to edges of a horizontal circle at a predetermined distance from the sides of the container, to maximize an area of the organic material turned by the auger. In addition, when viewed from the end of the shaft, the tines are evenly distributed around the shaft in a predetermined order that optimizes mixing while minimizing the manual effort required to turn the shaft.

Although not limited thereto, preferred materials for the internal auger shaft and handle include schedule 40 polyvinyl chloride (PVC), while the container may be made of 90 mil polyethylene plastic, and the tines may be in the form of zinc plated ¼" steel bolts that can be inserted through holes in the shaft and held in place by respective lock washers and hex nuts.

Also, while the container of the invention is not necessarily limited to a particular shape or dimensions, the container is preferably small enough to be carried by a user, and to be situated in a dwelling or garden during use. For example, an exemplary container may be in the form of a five gallon pail.

In addition to the internal auger, the composting pail preferably has multiple air vents in sidewalls of the container that aid in faster decomposition of organic matter, the air vents including wire mesh screens to prevent spillage of the contents of the container.

While the description of the preferred embodiment uses the term "pail," it is to be understood that the invention is intended to encompass any vessel or container capable of receiving waste to be composted, and into which a manually rotatable auger may be installed.

Optionally, when using the composting container of the present invention, peat moss and pine bedding may be included in the container before adding the organic waste and scraps to be composted. The pine bedding serves to provide spacing for added aeration, while both the pine bedding and peat moss serve as an added carbon source, and the kitchen scraps, vegetable garden debris and leafy plant trimmings providing a nitrogen source.

Finally, the container may include a plastic lid that can be removed from the top of the manually operated composting pail to add the pine bedding, peat moss, and organic matter to be composted, and that will normally be installed during use to keep out unwanted moisture and limit access by insects and vermin.

DETAILED DESCRIPTION OF THE PREFERRED EMBODIMENTS

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

Figure 1:
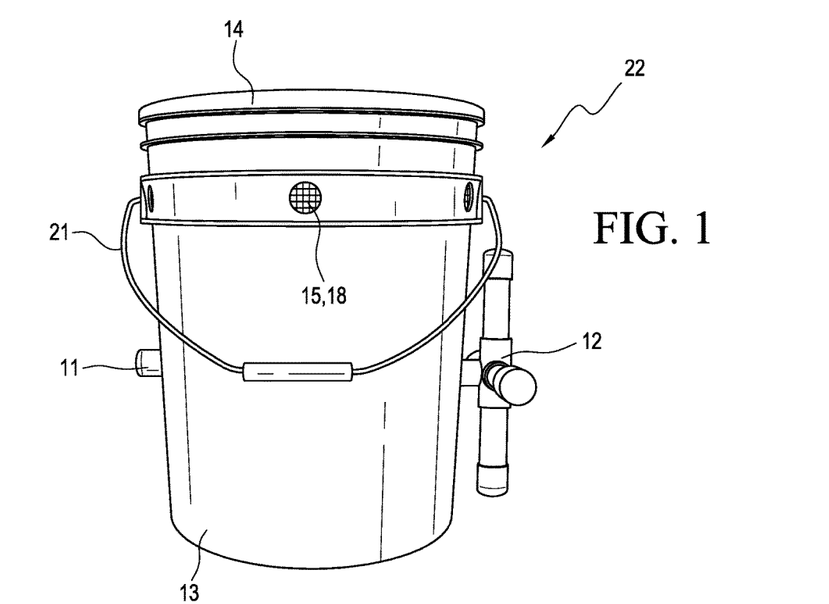
FIG. 1 is a front view of a composting apparatus in the form of a portable composting container with an internal auger, constructed in accordance with the principles of a preferred embodiment of the invention.
Figure 2:
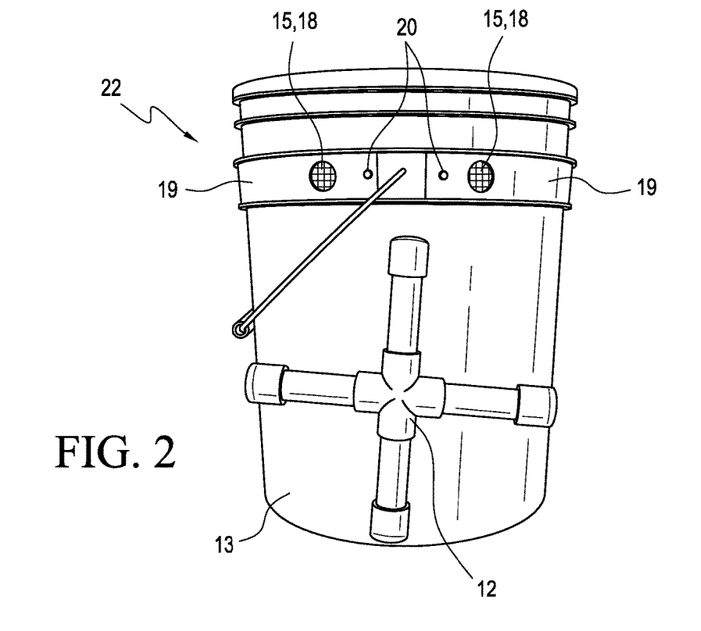
FIG. 2 is a side view of the portable composting container of FIG. 1.
Figure 3A:
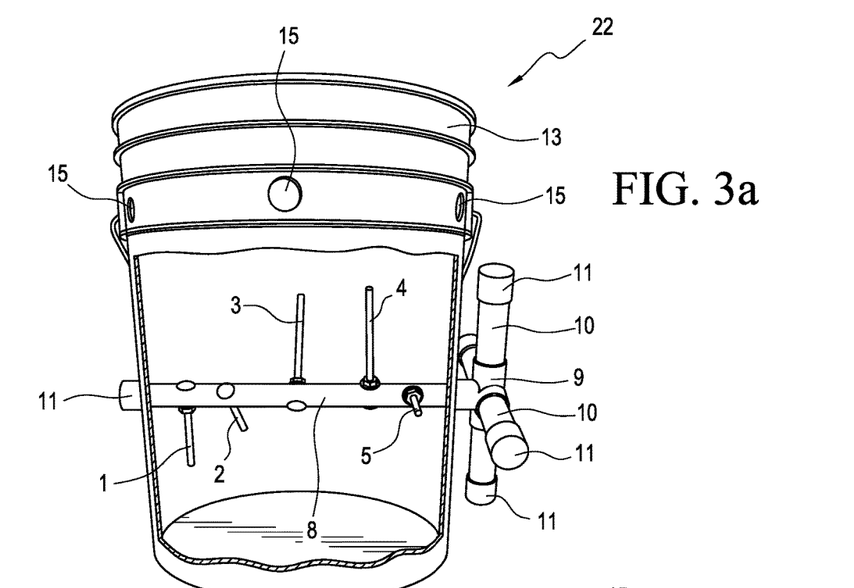
FIGS. 3a-3d show a partially cut-away front view of the portable composting container of FIG. 1, with the internal auger in four different angular positions.
Figure 3B:
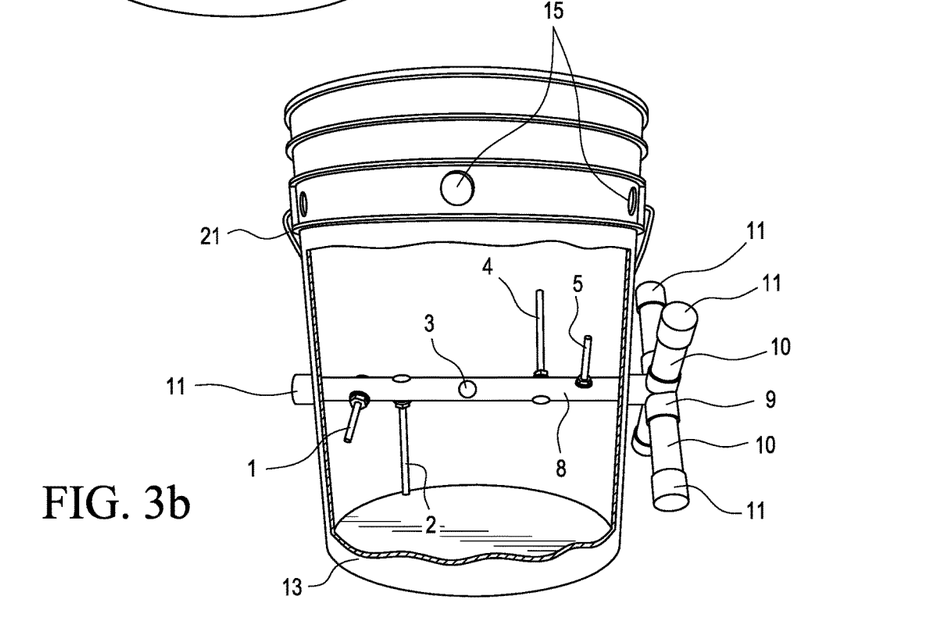
Figure 3C:
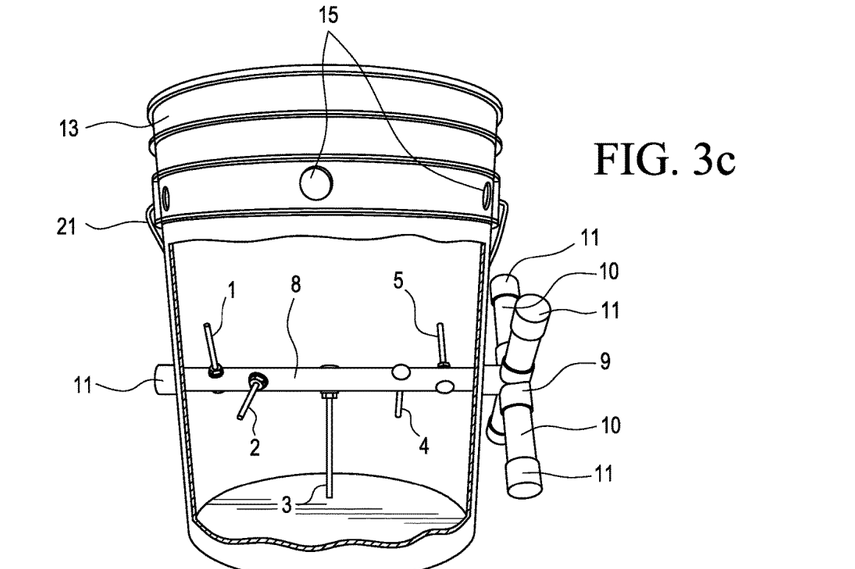
Figure 3D:
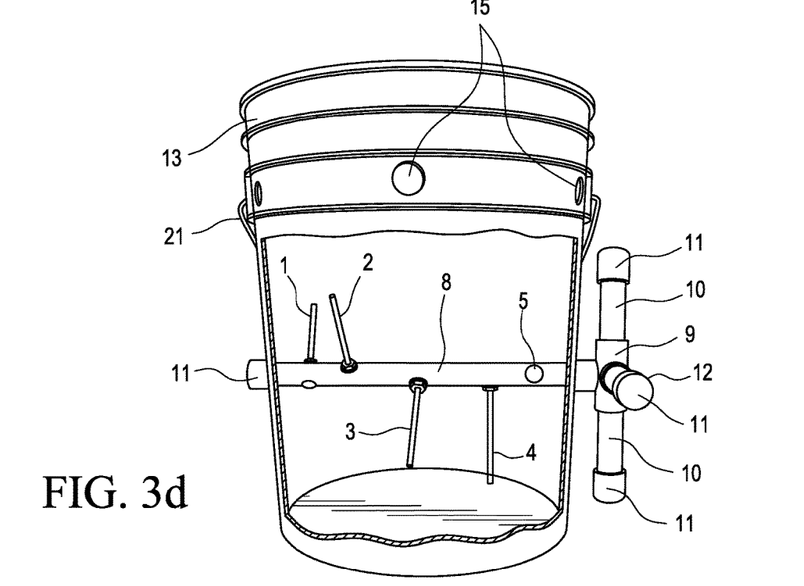
Figure 4:
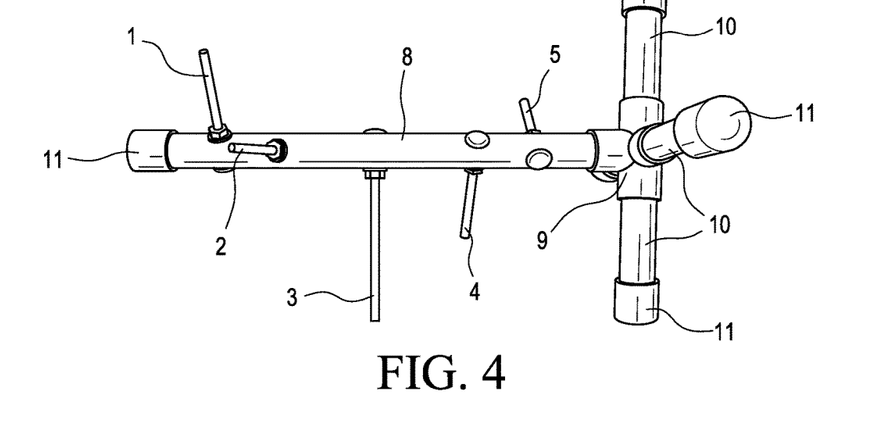
FIG. 4 is an isometric view of the internal auger shown in FIGS. 3a-3d.

As illustrated in FIGS. 1 and 2, the composting container or vessel of the preferred embodiment has the form of a generally cylindrical composting pail 22. The pail may be a five-gallon pail, for which 90 mil polyethylene plastic has been found to provide a good combination of light weight and sufficient rigidity to support an internal auger and other components, but it will be appreciated that the dimensions, shape, material, and thickness of the pail and other components may be varied without departing from principles of the invention.

The manually-operated composting pail 22 includes a flexible lid 14, which may be made of polyethylene plastic and which can be manually installed on top of the composting pail 22 to prevent rain, excess moisture and bugs from getting Into the pail. The lid 14 can be manually removed from the top of the manually operated composting pall 22 to add organic material that is to be composted into the interior of the composting pail 22, and subsequently again manually removed to allow air into the manually-operated composting pall 22 if more air is required to help aerate the organic matter that is to be composted.

As shown in FIG. 1, pail 22 may also include an optional handle 22, made for example of steel with a plastic sleeve 21 to facilitate gripping and carrying by a user.

The manually-operated composting pail 22 preferably includes a plurality of air vent holes 15 extending through sides of the pail The vent holes 15 are located at a vertical position that is above the highest point at which composting materials are to be added to the pail, so that the composting materials do not spill out of the vent holes. FIGS. 1 and 2 illustrate locations of the air vent holes 15 on all four exterior sides of the composting pail 22. A preferred diameter of the air vent holes 15 for the illustrated bucket is ⅞", although the illustrated dimensions, shapes, and numbers of holes are by way of example and not limitation. The holes are covered by a screen 18, which in the illustrated embodiment takes the form of a vinyl mesh that extends around all exterior sides of the pail 22, and that is supported by a vinyl or PVC screen frame 19. The screen 18 and screen frame 19 may be attached to the polyethylene plastic pail body 13 by, for example, ⅛"×⅜" aluminum rivets 20 shown in FIG. 2. The vent holes 15 aid in getting air into the composting pail 22 to help aerate the compost material and vent the interior of the composting pail 22. Screen 18 aids in preventing insects from entering the composting pail 22 through the vent holes 15.

The internal auger shown in FIGS. 3a-3d and 4 is arranged to be manually rotated by a handle 12 on an exterior of the pail 22, as shown in FIGS. 1 and 2. Handle 12 may be made of a plastic material and may be constructed from a five-way fitting 9, four pipes 10, and slip-on caps 11. Fitting 9 and pipes 10 may, by way of example and not limitation, include a ½" schedule 40 PVC fitting and ½" schedule 40 PVC pipe, with the pipes each having a length of 3½". It will be appreciated that the purpose of the handle is to enable a user to manually turn the internal auger, and therefore that the handle configuration, materials, and dimensions may be freely varied according to meet user preferences. The pipes 10 may be attached to the five-way fitting 9, and the slip-on caps 11 may be attached to the pipes 10, by a heavy duty PVC cement 23. In addition, PVC cement 23 may be used to attach the fitting 5 to auger shaft 8, shown in FIGS. 3 and 4.

The handle 12 and auger shaft 8 are designed to be rotated in either of two directions, i.e., clockwise or counterclockwise. Shaft 8 may also be made of schedule 40 PVC pipe and, for the illustrated embodiment, have a length of 12". The dual-rotational auger shaft 8 extends through holes 17 on two diametrically opposite sides of the composting pail 22. For a half inch shaft, the mounting holes 17 may have a diameter of ⅞" to stabilize the shaft 8 without restricting its movement. The dual rotational auger shaft 8 rotates on a central axis and extends ⅞" beyond each of the right and left side of the composting pail 22 to allow the handle 12 and a slip-on end cap 11, made for example of schedule 40 PVC, to be attached to opposite ends of the auger shaft 8 and secured by PVC cement.

The dual rotational auger shaft 8 has five holes 16 drilled along its axis through the dual rotational auger shaft 8, through which five tines 1, 2, 3, 4, and 5 are respectively inserted. The holes may have a diameter of ¼". The tines 1-5 may take the form of ¼" zinc-plated steel carriage bolts having different lengths, as described below, and held in place by five steel ¼" zinc plated steel lock washers 7 and a corresponding five ¼" zinc-plated steel hex nuts 6 threaded onto externally-threaded ends of the carriage bolts, with the lock washers 7 being sandwiched between the hex nuts 6 and the shaft 8 to prevent loosening of the hex nuts 6. It will be appreciated that the tines 1 to 5 may be attached by means other than threads, lock washers, and hex bolts, such as by welding rods of appropriate dimensions to the shaft, or by use of appropriate adhesives.

Figure 5:
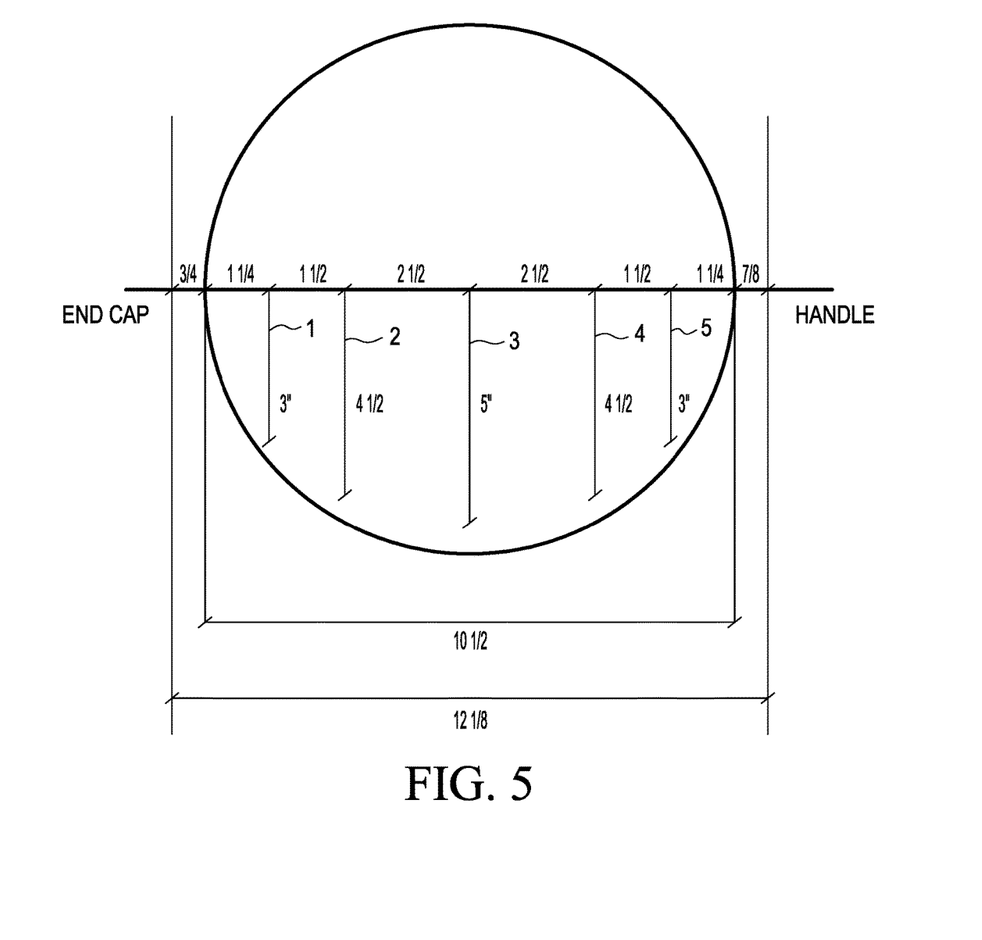
FIG. 5 is a schematic view showing a relationship between an inner circumference of the composting container and the tines of the internal auger shown in FIGS. 3a-3d.

As illustrated in FIGS. 3a-3d, and 4, the steel tines 1, 2, 3, 4, 5 are spaced at different distances along the length of the shaft, and also have different lengths, which are determined by the inside circumference of the pail body 13, as best illustrated in FIG. 5. In particular, the lengths of the tines are chosen such that the end of each respective tine extends to a predetermined distance from the inner circumference of the pail when the tine is rotated to a horizontal position in order to move a maximum mass of organic matter.

It will be appreciated that FIG. 5 is not a realistic depiction of the internal auger 12 in that the tines are not, in the preferred embodiment, arranged in a single plane. Instead, FIG. 5 shows the intersections of the tines with a horizontal plane when the tines are rotated into the plane, which will occur at different times due to the staggered arrangement of the tines, depicted in FIGS. 3a-3d, FIG. 4, and especially FIG. 7. As illustrated in FIG. 5, for a pail having a diameter of 10½" at the height of the shaft 8, the lengths of the respective tines from the shaft are, starting from the left side in FIG. 5, 3" for tine 1; 4.5" for tine 2; 5" for tine 3; 4.5" for tine 4; and 3" for tine 5. At these lengths, the spacing of the holes 16 along the shaft, starting with the left sidewall of the pail body 13 (as viewed in FIGS. 5 and 6), are: (a) 1.25" from the left sidewall to the first tine 1, (b) 1.5" from tine 1 to tine 2, (c) 2.5" from tine 2 to tine 3, (d) 2.5" from tine 3 to tine 4, (e) 1.5" from tine 4 5" tine 5, and (f) 1.25" from tine 5 to the right sidewall. This leaves a ¾" shaft length at the left side of the pail and a ⅞" shaft length extending from the right side of the pail, to respectively accommodate a slip-on end cap 11 and the handle 12.

It will be appreciated that the lengths of the tines could be varied from the illustrated lengths, in which case the spacing between the tines along the length of the shaft could also be varied to maintain a desired spacing between the ends of the tines and the sidewall of the pail, and thereby still achieve maximum movement of material by the tines. For example, the tines could be equidistantly spaced along the shaft, in which case tines 2 and 4 would be lengthened as they would be positioned more toward the center of the shaft than in the arrangement illustrated in FIGS. 5 and 6. However, an advantage of the illustrated spacing and tine lengths is to enable use of standard-length carriage bolts as the tines, avoiding the need for fractional bolt lengths, and thereby reducing costs.

Figure 6:
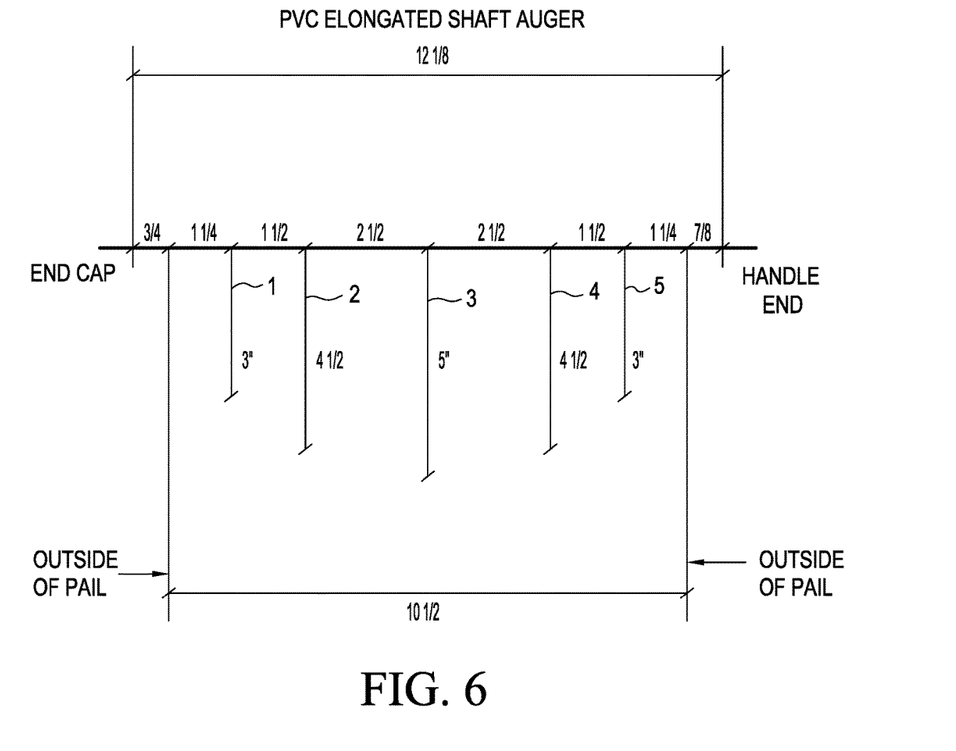
FIG. 6 is a schematic view showing a relationship between a bottom of the composting container and the tines of FIG. 5.

FIG. 6 is a schematic view similar to that of FIG. 5, but showing the intersections of the rotating tines 1-5 with a vertical plane extending through the rotation axis of shaft 8, rather than a horizontal plane as shown in FIG. 5. As seen in this figure, the pail itself is wider at the top than at the bottom, tapering from 12⅛" at the top to 10-38" at the bottom. The shaft 8 is situated at a distance of 5⅜" from the bottom of the pail body 13, so that the longest tine 3 extends to a distance of ⅜" from the bottom of the pail.

Figure 7:
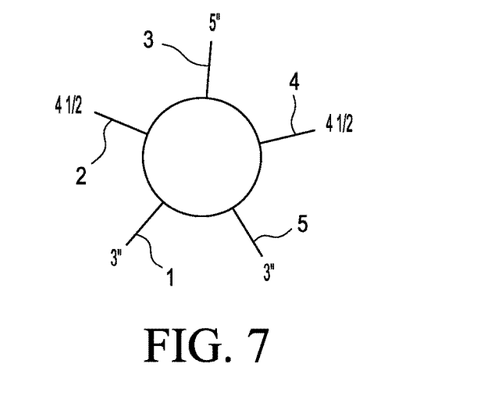
FIG. 7 is an end view of the internal auger of FIG. 4.

FIG. 7 is an end view of the internal auger 12 showing the manner in which the tines are arranged around the circumference of shaft 8. As shown therein, the tines 1 to 5 extend radially from the shaft and are spaced at equal angles. Since there are five tines, the angular spacing between the tines is 360/5=72 degrees. The order of the tines, starting with tine 1 and proceeding clockwise is: tine 1, tine 2, tine 3, tine 4 and tine 5. By distributing the tines in this manner, a maximum amount of composting material can be moved with a minimum of effort. Nevertheless, it will be appreciated that the order of the tines may be varied, as well as the angular spacing.

The composting pail 22 of the present Invention can aerate the compost in two ways. First, the organic matter can be aerated within the composting pall 22 using the dual rotational auger shaft 8. Second, the organic matter can be aerated from the top by blowing air through the holes 15 and screen 18 or when the lid 14 is removed or not provided.

In order to use the container of the preferred embodiment for composting, the following method may be utilized:

First, upon removal of the lid 14, peat moss and pine wood bedding material are inserted into the pail. Then, compostable organic household and garden waste and scraps are added and the lid is installed at the top of the pail. The waste is preferably cut up before loading into the pail since smaller pieces of organic matter will decompose more rapidly. In order to ensure that the internal auger can most easily be turned by a user, the compostable material, including the peat moss and pine wood bedding, should be filled to a height from the bottom of the pail that is, at most, equal to the height of the longest tine (center time 3) when the longest tine is in an upper vertical position. In other words, the compostable material should preferably not cover the longest tine when the longest tine is in its uppermost position.

Second, after loading of the pail with the peat moss, bedding, and compostable organic material, the handle 12 is manually turned eight or ten times in both forward and reverse directions to mix and turn over organic matter in order to aerate and cause faster decomposition of the organic matter.

In order to maintain aeration and provide for faster decomposition, the composting material is periodic turned to maintain a temperature of 90 degrees to 140 degrees Fahrenheit within the pail, which will kill disease and odor-causing organisms and provide a good environment for the most effective decomposer organisms.

Peat moss and bedding may be added if the organic material inside the pail appears to be overly moist, while the lid may be periodically removed to let the organic matter get sun and air and dry out.

After the organic waste and scraps have been composted, they are removed from the pail for air drying and application to garden, trees, and house plants.

What is claimed is:

1. A composting apparatus, comprising:
   a container having an internal, manually-operable auger,
   wherein the internal, manually-operable auger includes a rotatable shaft extending horizontally through the container, a plurality of tines extending radially from the shaft with the container, and a handle fixed to the shaft on an outside of the container for rotating the shaft in order to cause the plurality of tines to move and turn compostable organic materials within the container,
   wherein the container is a generally cylindrical pail having a flat bottom and curved sides, the shaft extends through openings on diametrically opposite sides of the pail, and each of the tines extend to a same predetermined distance from a curved side of the pail when rotated to a respective horizontal position.

2. A composting apparatus as claimed in claim 1, wherein the tines have differing lengths, the tines closest to the sides of the pail having a shortest length and the tines closest to the center of the pail having a longest length.

3. A composting apparatus as claimed in claim 2, wherein the tines are angularly distributed around a circumference of the shaft such that each tine extends in a different radial direction.

4. A composting apparatus as claimed in claim 3, wherein the shaft is made of a plastic material and includes mounting holes for the tines, and wherein the tines are made of a metal material and extend through the holes.

5. A composting apparatus as claimed in claim 4, wherein the tines are linear carriage bolts and are secured to the shaft by respective lock washers and hex nuts threaded onto the bolts.

6. A composting apparatus as claimed in claim 5, wherein the shaft is made of polyvinyl chloride and the tines are zinc-plated steel bolts.

7. A composting apparatus as claimed in claim 6, wherein the handle includes a multiple-way pipe fitting attached by an adhesive to one end of the shaft, and a plurality of pipes extending radially from and also attached to the fitting.

8. A composting apparatus as claimed in claim 7, wherein the handle is made of PVC.

9. A composting apparatus as claimed in claim 6, wherein the pail is made of a 90 mil polyethylene material.

10. A composting apparatus as claimed in claim 6, wherein:
    the pail has a volume of approximately five gallons and a diameter of approximately 12",
    a number of the tines is five,
    the tines are spaced along the shaft, starting from a first sidewall of the pail, according to the following dimensions: (a) 1.25" from the first sidewall to a first tine, (b) 1.5" from the first tine to a second tine, (c) 2.5" from the second tine to a third tine, (d) 2.5" from the third tine 3 to a fourth tine, (e) 1.5" from the fourth tine to a fifth tine 5, and (f) 1.25" from the fifth tine to a sidewall opposite the first sidewall, and
    the first to fifth tines have approximately the following respective lengths: 3", 4.5", 5", 4.5", and 3".

11. A composting apparatus as claimed in claim 2, wherein a number of the tines is five,
    the tines are spaced along the shaft, starting from a first sidewall of the pail, according to the following dimensions: (a) 1.25" from the first sidewall to a first tine, (b) 1.5" from the first tine to a second tine, (c) 2.5" from the second tine to a third tine, (d) 2.5" from the third tine 3 to a fourth tine, (e) 1.5" from the fourth tine to a fifth tine 5, and (f) 1.25" from the fifth tine to a sidewall opposite the first sidewall, and
    the first to fifth tines have approximately the following respective lengths: 3", 4.5", 5", 4.5", and 3".

12. A composting apparatus as claimed in claim 3, wherein the tines are spaced at equal angles around the shaft.

13. A composting apparatus as claimed in claim 12, wherein a number of the tines is five, and the tines are spaced at 72 degree angles from each other.

14. A composting apparatus as claimed in claim 1, further comprising vent openings extending through sidewalls at an upper end of the pail.

15. A composting apparatus as claimed in claim 14, wherein the vent openings are covered by a mesh to prevent entry of insects through the openings.

16. A composting apparatus as claimed in claim 1, further comprising a lid and carrying handle.

17. A composting apparatus as claimed in claim 1, wherein the tines are carriage bolts and are secured to the shaft by respective lock washers and hex nuts threaded onto the bolts.

18. A composting method, comprising the steps of:
providing a composting pail having an internal, manually-operable auger that includes a rotatable shaft extending horizontally through the pail, a plurality of tines extending radially from the shaft with the pail, and a handle fixed to the shaft on an outside of the pail for rotating the shaft in order to cause the plurality of tines to move and turn compostable organic materials within the pail;
adding pine wood bedding and peat moss to the pail;
adding natural organic waste and scraps from a household or garden to the pail; and rotating the handle to mix the pine bedding and peat moss with the natural organic waste and scraps.

* * * * *